(12) United States Patent
Chang

(10) Patent No.: US 7,536,804 B2
(45) Date of Patent: May 26, 2009

(54) MEASURING TAPE DEVICE WITH ILLUMINATION FUNCTION

(76) Inventor: Ming-Chi Chang, 235 Chung - Ho Box 8-24, Taipei (TW)

( * ) Notice: Subject to any disclaimer, the term of this patent is extended or adjusted under 35 U.S.C. 154(b) by 94 days.

(21) Appl. No.: 11/731,860

(22) Filed: Apr. 2, 2007

(65) Prior Publication Data
US 2008/0235975 A1 Oct. 2, 2008

(51) Int. Cl.
*G01B 3/10* (2006.01)
(52) U.S. Cl. .......................................... 33/760; 33/770
(58) Field of Classification Search ................ 33/755, 33/758–759, 761, 768, 770–771
See application file for complete search history.

(56) References Cited

U.S. PATENT DOCUMENTS

| | | | | |
|---|---|---|---|---|
| 4,580,347 A * | 4/1986 | McKnight | ................... | 33/760 |
| 5,430,952 A * | 7/1995 | Betts | ............................ | 33/760 |
| 6,928,029 B2 * | 8/2005 | Rickman | ....................... | 33/760 |
| 7,065,895 B2 * | 6/2006 | Hoopengarner | ............... | 33/760 |
| 7,174,655 B1 * | 2/2007 | Gibbons et al. | ................ | 33/761 |
| 7,185,445 B2 * | 3/2007 | Rhead | .......................... | 33/755 |
| 7,234,246 B1 * | 6/2007 | Rhead | .......................... | 33/755 |
| 7,260,899 B2 * | 8/2007 | Jones | .......................... | 33/760 |
| 7,353,619 B2 * | 4/2008 | Gibbons et al. | ................ | 33/761 |
| 2004/0237326 A1 * | 12/2004 | Wang | .......................... | 33/760 |
| 2006/0042111 A1 * | 3/2006 | Hoopengarner | ............... | 33/760 |
| 2007/0101600 A1 * | 5/2007 | Alders | ......................... | 33/760 |
| 2007/0107248 A1 * | 5/2007 | Jones | ........................... | 33/760 |

* cited by examiner

*Primary Examiner*—Yaritza Guadalupe-McCall

(57) ABSTRACT

A measuring tape device with illumination function comprises a casing; a measuring tape received in the casing; an illuminator having a switch and an illuminating unit; the switch serving for actuating the illuminating unit; the illuminating unit being installed at a lateral side of the casing and near the measuring tape and hook; a cover covering upon the illuminating unit; the cover being reflective and deflective so that light is incident into the measuring tape for viewing the scales on the measuring tape. The casing has at least one battery. The illuminating unit is one of a bulb or light emitting diodes. The cover has a cross section of a right triangular. One side of the cover faces toward an exterior of the casing and another side of the cover faces toward the measuring tape.

2 Claims, 3 Drawing Sheets

MEASURING TAPE DEVICE WITH ILLUMINATION FUNCTION

FIELD OF THE INVENTION

The present invention relates to measuring tapes, and particularly to a measuring tape device with illumination function, wherein an illuminator is installed aside a measuring tape, in working, the illuminator can illuminate the measuring tape so that the worker can view the scale easily.

BACKGROUND OF THE INVENTION

Conventionally, a measuring tape is located with a casing. In use the measuring tape is drawn out from the casing for measuring a length of an object to be measured. However, the measuring tape is not equipped with light so that when it is used in dark place, another illuminator must be prepared.

In one improvement, the casing of the measuring tape is installed with a light for illuminating the measuring tape so that the user can view the scales clearly. In this prior art, the light is installed at an upper side of the casing so that the light can not illuminate the measuring tape clearly and thus the effect is low. Furthermore the light protrudes from the casing so as to induce some inconvenient in carrying out.

In another improvement, a reflector is installed as one edge of the casing for reflecting the light to the measuring tape, however, the light is installed at the edge far away from the measuring tape. As a result, the reflecting light is insufficient.

SUMMARY OF THE INVENTION

Accordingly, the primary object of the present invention is to provide a measuring tape device with illumination function, wherein an illuminator is installed aside a measuring tape, in working, the illuminator can illuminate the measuring tape so that the worker can view the scale easily.

To achieve above objects, the present invention provides a measuring tape device with illumination function comprises a casing; a measuring tape received in the casing; an illuminator having a switch and an illuminating unit; the switch serving for actuating the illuminating unit; the illuminating unit being installed at a lateral side of the casing and near the measuring tape and hook; a cover covering upon the illuminating unit; the cover being reflective and deflective so that light is incident into the measuring tape for viewing the scales on the measuring tape. The casing has at least one battery. The illuminating unit is one of a bulb or light emitting diodes. The cover has a cross section of a right triangular. One side of the cover faces toward an exterior of the casing and another side of the cover faces toward the measuring tape.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
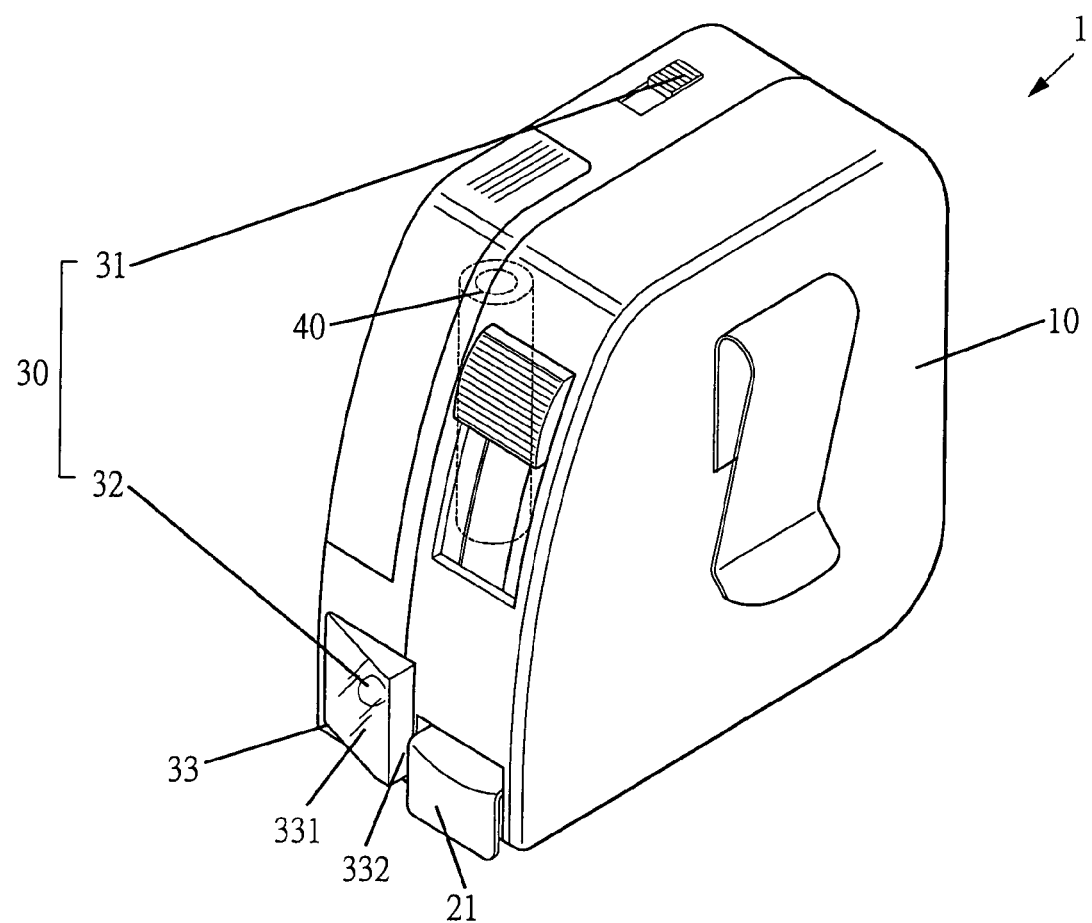
FIG. 1 is a perspective view of the measuring tape device with illumination function of the present invention.
Figure 2:
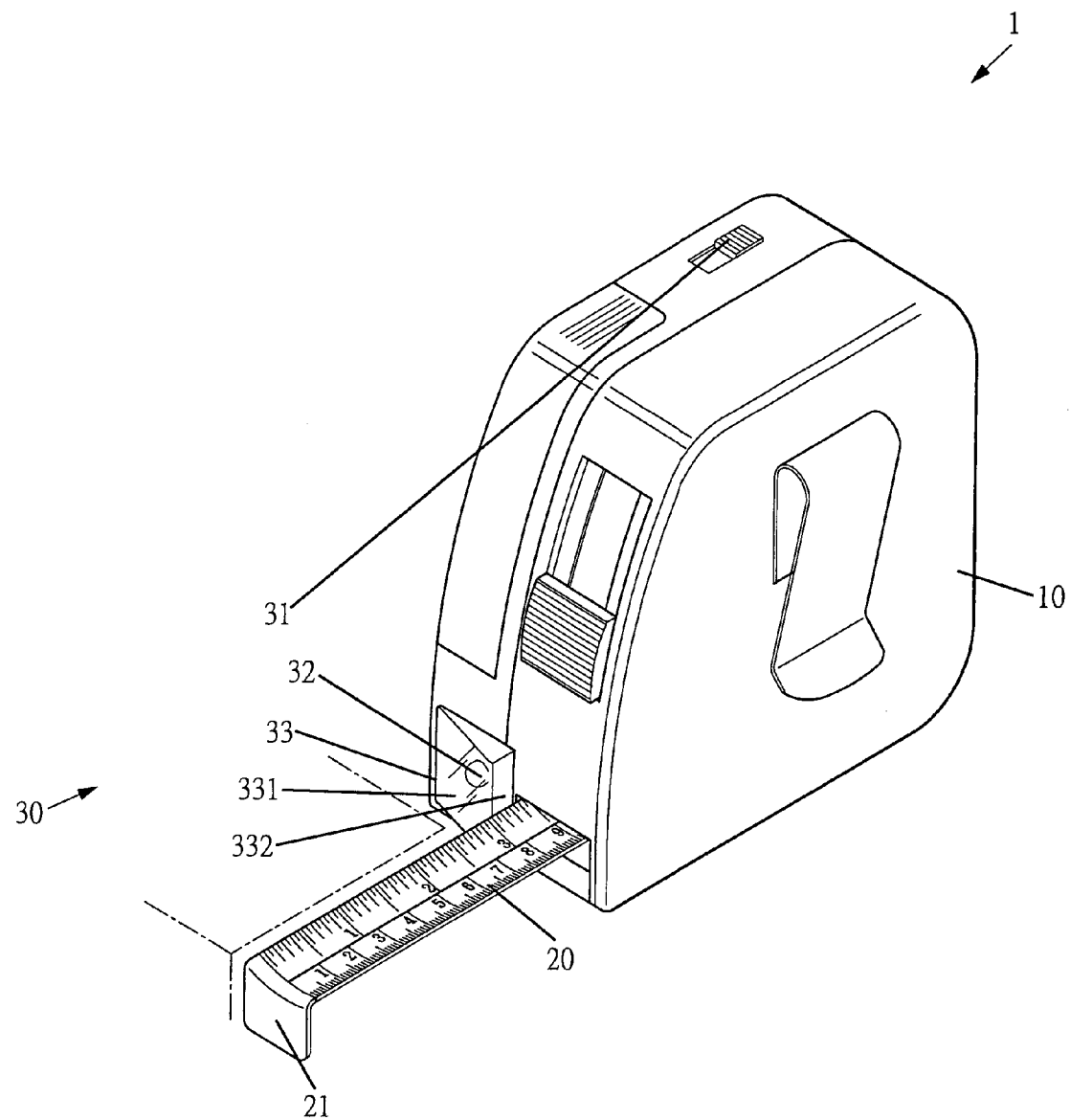
FIG. 2 is a schematic view showing the application of the measuring tape device with illumination function of the present invention.
Figure 3:
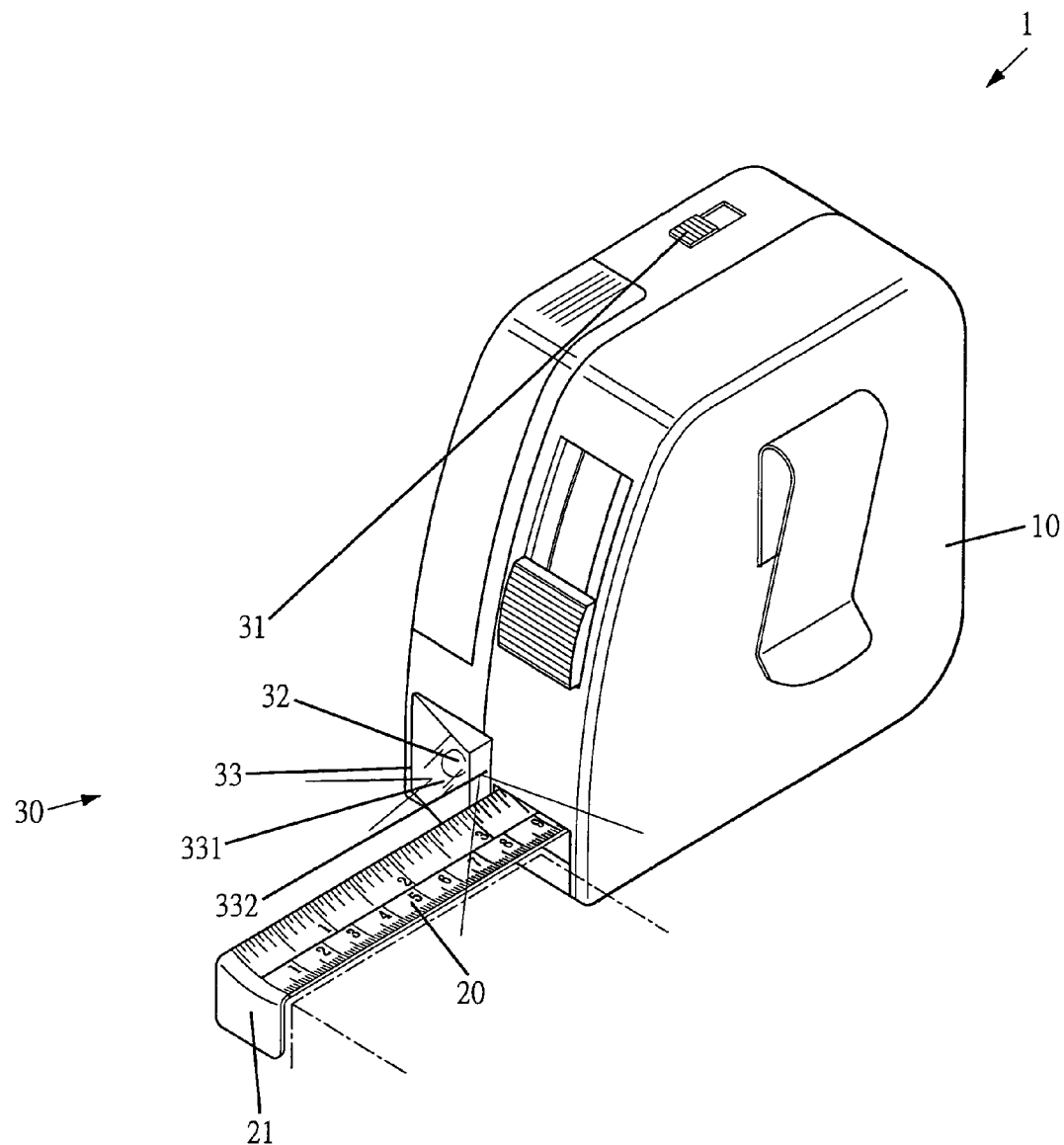
FIG. 3 is another schematic view showing another application of the present invention.

Referring to FIGS. 1 to 2, the measuring tape 1 with illumination function of the present invention is illustrated. The present invention has the following elements.

A casing 10 has at least one battery 40.

A measuring tape 20 is received in the casing 10. One end of the measuring tape 20 is formed with a hook 21. The measuring tape 20 is made of elastic steel sheet. The hook 21 can be buckled to an object to be measured. The measuring tape 20 can be bent around the object to be measured by holding the hook 21 so as to measure the length of the object.

An illuminator 30 has a switch 21 and an illuminating unit 32. The switch 21 is installed at an upper side of the casing 10 for actuating the illuminating unit 32. The illuminating unit 32 may be for example a lamp or light emitting diodes. The illuminating unit 32 is installed at a lateral side of the casing 10 and near the measuring tape 20 and hook 21. A cover 33 covers upon the illuminating unit 32. The cover 33 is transparent or non-transparent. The casing 10 has two sides. One long and large side faces an exterior of the casing 10 and one short and smaller side faces the measuring tape 20 and the hook 21. Preferably, the cover 33 has a right triangular cross section. Moreover, the cover 33 has the function of reflection and deflection.

Advantage of the long and larger side is that when working in dark area, the light emitted out from the long and larger side of the cover 33 will illuminate the working environment so that the user can view the object clearly. The light emitted from the short and smaller side of the cover 33 will illuminate the measuring tape 20 and hook 21 so that the worker can view the scale clearly. Thus the worker can work conveniently in the dark places.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A measuring tape device with illumination function, comprising:

a casing (10) having at least one battery (40) therein;

a measuring tape (20) received in the casing (10); one end of the measuring tape (20) being formed with a hook (21); the measuring tape (20) being made of elastic steel sheet; the hook (21) protruding from a lower lateral side of the casing (10) and can be buckled to an object to be measured;

an illuminator (30) having a switch (31) and an illuminating unit (32); the switch (31) being installed at an upper side of the casing (10) for actuating the illuminating unit (32); the illuminating unit (32) being installed at the lateral side of the casing (10) and at the same level of and aside the measuring tape hook (21);

a cover (33) covering upon the illuminating unit (32); the cover (33) being transparent or non-transparent; the cover (33) having a right triangular tapered shape and having the function of reflection and deflection; and a rectangular bottom of the cover (33) facing the hook (21).

2. The measuring tape device with illumination function as claimed in claim 1, wherein the illuminating unit (32) is selected from a lamp and light emitting diodes.

* * * * *